Oct. 9, 1973    L. J. HRUSOVSKY    3,764,401
METALLIC ARTICLES AND THE MANUFACTURE THEREOF
Filed Nov. 17, 1970    4 Sheets-Sheet 1

INVENTOR
Louis J. Hrusovsky

BY
ATTORNEYS

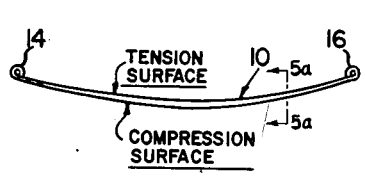
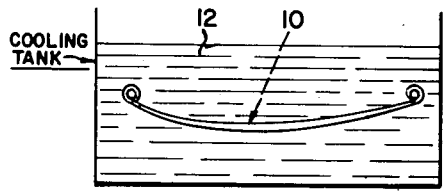
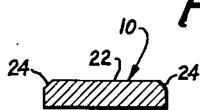
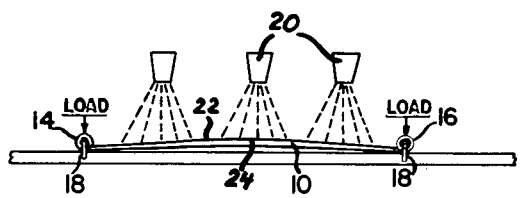
Fig-8.
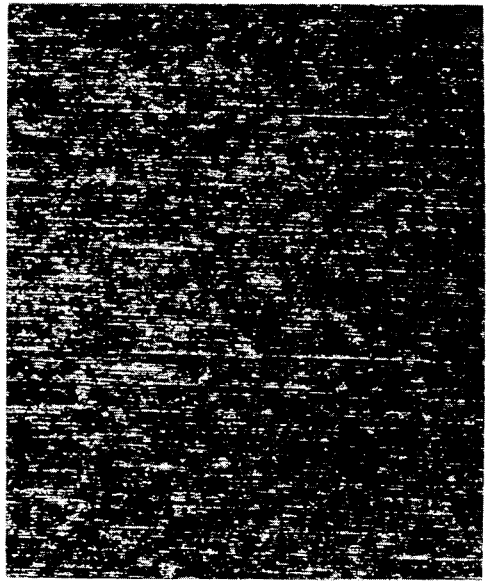
Fig-9.

SHOT PEENED AT

+70°F

ROUGHNESS HEIGHT
ARITHMETICAL AVG.
IN MICRO. INCH

76 MIN.
92 MAX.

-100°F

43 MIN.
62 MAX.

-320°F

25 MIN.
45 MAX.

INVENTOR
Louis J. Hrusovsky

BY Strauch, Nolan, Neale, Nies & Kurz
ATTORNEYS

3,764,401
METALLIC ARTICLES AND THE MANUFACTURE THEREOF

Louis J. Hrusovsky, Bloomfield Hills, Mich., assignor to North American Rockwell Corporation, Pittsburgh, Pa.
Continuation-in-part of abandoned application Ser. No. 681,487, Nov. 8, 1967. This application Nov. 17, 1970, Ser. No. 90,343
Int. Cl. C21d 7/06
U.S. Cl. 148—11.5 R         9 Claims

ABSTRACT OF THE DISCLOSURE

The manufacture of articles from non-austenitic metallic materials by a technique in which the article is formed to essentially its final configuration; cooled; and, while cooled, worked to produce residual compressive stresses in one or more surface portions of the article.

RELATION TO OTHER APPLICATIONS

This application is a continuation-in-part of application No. 681,487 filed Nov. 8, 1967, and now abandoned.

BACKGROUND, SUMMARY AND OBJECTS OF THE INVENTION

The present invention relates to the manufacture of metallic articles and, more particularly, to the manufacture of metallic articles having improved fatigue life and stress corrosion resistance.[1] The principles of the present invention are particularly adaptable to the manufacture of articles which, under operating conditions, are subjected to dynamic loading producing cyclic, high magnitude bending or trosion stresses such as leaf and torsion bar springs for vehicles. The principles of the present invention will accordingly be developed primarily by relating them to such applications of the invention. By doing so, however, it is not meant to limit the scope of the invention, which is intended to be defined only by the appended claims.

In my novel method for manufacturing metallic articles such as those identified above, the article is formed to essentially its final shape from a non-austenitic metal or alloy. The article is then cooled, typically to a temperature of zero degrees Fahrenheit or lower. While it is cooled, one or more surface portions of the article are worked—by shot or strain peening, for example. The article is then allowed to return to ambient temperature.

The working of the cooled metal induces residual compressive stresses in the surface portion or portions of the article which are worked. Due to the generation of such stresses, articles produced in accord with the principles of the present invention have improved fatigue life and improved stress corrosion resistance.

It is essential, in the present invention, that the article be formed to substantially its final shape before it is subjected to the cold temperature working step. The residual compressive stresses generated by this step exist only in the outermost surface portions of the treated parts of the article. Consequently, if these surface portions are ground or machined or otherwise removed after the cold temperature working, the benefits of this treatment will be lost. Furthermore, steps such as forming a bar into a coil spring after working at cold temperatures will relieve the residual compressive stresses and will, in fact, even generate deleterious residual tensile stresses.

The working of metals at low temperature has heretofore been proposed in U.S. Letters Patent Nos. 2,527,287 to Ziegler and in Ziegler et al., "Hardening of Austenite Stainless Steels by Mechanical Working at Sub-zero Temperatures," American Society for Testing Metals Proceedings 50, pages 861–881 (1950).[2] The basic difference between what is disclosed in the foregoing references and the present invention is that Ziegler applied the cold temperature working technique solely to austenitic steels while the present invention is concerned solely with the treatment of non-austenitic materials. That is, I have disclosed herein for the first time the novel use of cold temperature working to improve the properties of non-austenitic metallic materials.

When austenitic steels are cooled to the temperatures contemplated by the present invention, there is a change of crystalline structure from austenitic to martensitic, thereby increasing the hardness of the material. By shot peening or otherwise working the material at this reduced temperature, it can be caused to retain the martensitic structure and consequent hardness upon being returned to ambient temperature. It is abundantly clear that this is the result sought in the Ziegler process since the material thus worked is then subjected to a high temperature aging treatment to further increase its hardness.

Further, in the Ziegler process, there is no generation of residual compressive stresses by the working at reduced temperatures. This is because the phase change from austenite to martensite is accompanied by an increase in volume so that any compressive stresses generated by the cold temperature working are automatically relieved. Furthermore, the subsequent high temperature aging treatment would relieve such stresses even if they were generated in the cold temperature working.

As there is no generation of residual compressive stresses in the Ziegler process, there is no improvement in the fatigue life or stress corrosion resistance of the treated materials (at least stress corrosion resistance may in fact be impaired to some extent). Thus the major change in the physical properties of materials so treated is an increase in hardness although increases in tensile strength, yield stress, and proportional limit are also claimed.

To contrast the technique of the present invention with the Ziegler process, there is no phase change in the former since it is applied only to non-austenitic metals and alloys.[3] There is no increase in hardness, and no terminal aging step is employed to increase this property. Most important, however, there is a generation of residual compressive stresses in the worked surface portions of the material with a consequent improvement in fatigue life and stress corrosion resistance.

As indicated above, shot peening is one technique which may be used to work metals in accord with the process described herein. Shot peening to improve the fatigue life of metal articles has been long known in the metal working industry, and shot peening the surfaces of leaf springs, coil springs, torsion bar springs and the like operationally stressed members to improve their endurance limits is described in U.S. Letters Patent No. 1,947,927 to Vorwek. Shot peening of only the tension surface of a leaf spring is described in U.S. Letters Patent No. 2,608,752 to Schilling. However, in all of the prior art methods the shot peening operation is performed at or above room temperature usually immediately after tempering when the metal of the spring leaf may still be hot or is cooling or has cooled to room temperature.

---
[1] For a discussion of stress corrosion, see Suss, "Stress Corrosion—Causes and Cures," Materials in Design Engineering, April 1965, pages 102–105, 146, and 148.

[2] A similar process is described in U.S. Letters Patent No. 3,795,219 to Angel.

[3] In fact, if the presence of austenite is suspected, materials which are to be treated by the process disclosed herein are cooled to a sub-zero temperature to convert the austenite to martensite and then heat treated to temper the freshly formed martensite before they are cooled and worked.

It has also been proposed to grind or polish the tension surface and adjacent edges of a spring leaf as a step after heat treatment but prior to strain peening to eliminate surface defects which in part may offset the beneficial effect otherwise obtainable from the shot peening treatment. Such improved processes are disclosed in U.S. Patent No. 3,238,072 and copending applications Ser. Nos. 449,485 and 449,486, both filed Apr. 20, 1965; and the present invention may be advantageously applied to the foregoing processes to further improve endurance of the spring leaf.

In the manufacture of leaf springs for vehicle suspensions, which is one field to which the present invention may be advantageously applied as indicated above, the problem of fatigue failure has been and always will be of great concern; and various metal treating methods have been suggested and are still being practiced to improve the resistance to fatigue.

It has been well established that fatigue generally initiates at that surface of the spring leaf where the stress is greatest and boundary conditions unfavorable. This surface is conventionally designated as the tension surface of the leaf, and premature fatigue failure can be attributed to such stress raisers as edge indentations, cracks, non-metallic inclusions, surface laps and folds and other irregularities at or immediately below the tension surface. Present attempts to counteract these detrimental surface conditions include such measures as surface grinding or polishing and shot peening. However, even if shot peened under strain, maximum effect of the shot peening treatment was not always obtainable in spring leaves operating with a certain stress range.

The beneficial effect of shot peening is further influenced by the fact that as the shot impinge upon the surface of the metal member they produce depressions in the surface causing plastic flow of surface metal. In instances, as when "over peening," the depressions may become deep and develop into cracks or folds or sharp edges may be produced around some of the depressions, thus actually forming stress raisers which it was originally intended to combat by the shot peening treatment. In the present invention plastic flow of the surface metal during shot peening is inhibited to reduce or eliminate the adverse effects of "over peening" and prevent excessive plastic metal flow since the metal member is maintained in a chilled condition (preferably at a sub-zero temperature) while being shot or strain peened. In this regard, it is generally known that hardness and yield and tensile strengths of steel increase with successively lower temperatures, although this increase is transitory and is lost when the steel returns to room temperature. The increases in these strengths along with the increased hardness considerably augment the shot or strain peening effect on chilled steel because plastic metal flow is largely inhibited.

In regard to other metal treating processes heretofore proposed which involve chilling of the metal to be treated, the cooling of high speed steels for cutting tools to be sub-ambient temperature to improve their productivity and life is described in an article by P. Gordon and M. Cohen in the publication, A. S. M. Transactions, September, 1942, volume 30, pages 569–591. Chilling of the metal to sub-zero temperatures has also been found to be useful in the welding and metal flame cutting art to relieve the weld or cutting area of undesirable tensile stresses and thus improve the strength of the weld. This method is described in U.S. Letters Patent No. 2,824,818 to Swenson, and No. 3,282,748 to Martens. However, these localized treatments had no effect on the overall fatigue life or stress corrosion resistance of the metal article itself but only served to strengthen the weld and the immediate weld or flame cutting area.

SUMMARY OF THE INVENTION

The present invention proposes a movel manufacturing process for metal members, especially those subjected to springs and similar articles to considerably increase resistance to the fatigue and stress corrosion of these members in operation. This is accomplished by essentially combining suitable chilling of the metal, which must be non-austenitic, with cold working while the metal is chilled with unexpectedly advantageous results, the foregoing being a major object of the invention.

The novel method of the invention may consist in one aspect of forming a heat treated, non-austenitic steel or like non-ferrous metal blank to the shape of a spring leaf, refrigerating the formed spring leaf to a temperature well below the temperature of the ambient atmosphere and preferably below 0° F. and mainly below —40° F., and immediately shot peening at least one surface of the refrigerated spring leaf to generate residual compressive stresses in the spring leaf surface.

Accordingly, another important object of the invention is to considerably increase the fatigue life and stress corrosion resistance of a steel leaf spring by refrigerating and immediately subjecting the chilled spring leaf at least on the tension side to a shot peening operation.

Another object of the invention is to provide a novel spring leaf manufacturing method in which a taper rolled and heat treated ferrous metal spring leaf is chilled to a temperature between 0° and —320° F., strained in the direction of normal service loading to introduce a prestress in the leaf, and shot peened at least on the tension surface and usually the adjacent side edges as well while the spring leaf is in stressed condition and the metal is refrigerated.

BRIEF DESCRIPTION OF DRAWINGS

FIG. 5 is a diagrammatic illustration in side elevation of a typical, single tapered spring leaf for a vehicle suspension;

FIG. 5a is a section through the constant width spring;

FIG. 6 shows the spring leaf of FIG. 5 being chilled;

FIG. 7 shows the chilled spring leaf of FIG. 6 in strained condition while being shot peened on the tension surface;

FIG. 8 is an enlarged microphotograph showing the condition of a portion of the tension surface of a spring leaf shot peened at room temperature;

FIG. 9 is a microphotograph similar to FIG. 8 but illustrating the condition of the area shot peened at about —320° F.;

DESCRIPTION OF PREFERRED EMBODIMENTS

Figure 1:
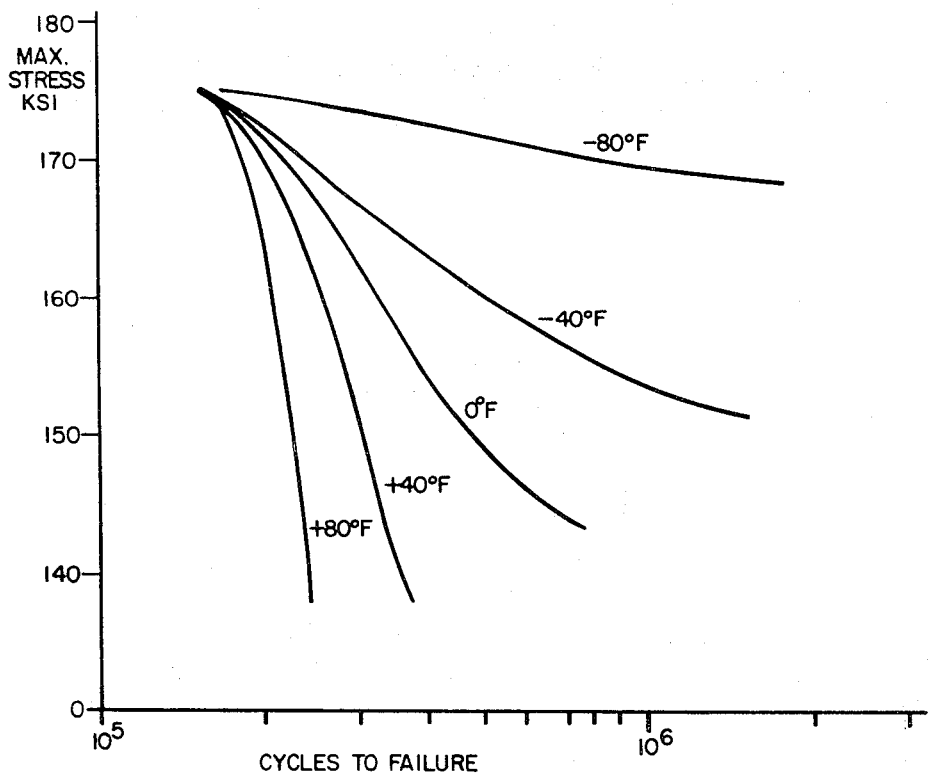
FIG. 1 is a graph containing curves showing the cycles to failure of samples peened at temperatures ranging from +80° F. to —80° F. and to which the indicated stress was applied.

For illustrative purposes the present invention will be described in detail herein as being applied as a processing step in the manufacture of leaf springs for vehicles. However, as stated above, it will be understood that the invention may be applied to a variety of other metal articles or parts as well and particularly to coil springs, torsion bars, drive shafts, axle shafts and similar members which are subject to dynamic loading and/or relatively high repeating stresses during operation. Repeating stresses as referred herein include stresses not completely reversed;

that is, from substantially zero to maximum allowable stress in each cycle.

In the manufacture of spring leaves, the shot peening or strain peening operation is usually carried out as one of the last steps in the manufacturing process. For example, a spring leaf is usually made by providing a blank which has been cut from a length of spring steel, formed to shape (such as by taper rolling), heat treated, camber quenched and tempered. After that—in accordance with the present novel method disclosed herein—the partially finished spring leaf is chilled to 0° F. or below and immediately shot or strain peened while in refrigerated condition. Strain peening is shot peening of a loaded stressed spring. Subsequent fatigue tests by cycling showed that the spring leaves which had been shot or strain peened at these low temperatures had a considerably increased life within a particular stress range used for cycling as compared to spring leaves cycle tested within the same stress range which had been shot or strain peened in a conventional manner; that is, near or above room temperature.

The invention includes the discovery that cold working the leaf spring while it is chilled generates residual compressive stresses in the surfaces which are worked with a consequent beneficial increase in the fatigue life and stress corrosion resistance of the spring leaf. It has been discovered that, since the improvement in fatigue life and stress corrosion resistance are increased with successively lower temperatures, the spring leaf to be shot or strain peened should be chilled as much as practically possible and as may be determined by the operation characteristics of the metal involved and the particular leaf spring member operating within a desired stress range. This can be accomplished in normal shop operations and with presently known cooling methods and equipment; and it is believed that the low limit is probably about −320°, which is the temperature of liquid nitrogen.

Leaf spring manufacturing processes in which the method of the invention may be advantageously included comprise the manufacture of single tapered leaf springs as described in United States Letters Patent No. 3,145,984, issued Aug. 25, 1964, to W. A. Hallam for "Single Taper Leaf Spring." A length of spring steel may be processed in accordance with the method disclosed in United States Letters Patent No. 3,238,072, issued Mar. 1, 1966 to R. R. Green et al. for "Method of Making Taper Leaf Springs." This involves the sequential steps of hot taper rolling, end forming, heat treating, camber quenching, tempering and grinding of the proposed tension surface and the edges adjacent the tension surface. Thereafter, the partially finished single taper leaf spring is shot peened at least on the tension side and adjacent edges, the leaf usually being strained in the direction of applied service loading while being shot peened (stress or strain peening).

It has been established that shot peening increases the fatigue strength of a metal leaf spring; and, since the weight of the spring is inversely proportional to the square of the strength of the spring material, it follows that, if the strength is increased by shot peening, the weight of the spring leaf can be reduced proportionately, thus making possible the single taper leaf spring.

The increase in strength due to shot peening is believed to be due to the entrapment of beneficial residual compression stresses near the shot peened surface which in effect is equivalent to some pre-loading so that any applied tension stresses during operation will be reduced to a safe level by the countereffect of the entrapped residual compression stresses. An increase in the residual compression stresses is effected when the metal member is loaded statically during the shot peening operation to introduce compressive stresses at the surface being shot peened, and thus a large amount of these beneficial residual stresess are trapped in the sub-surface layers during shot peening.

The present invention provides a novel method to even further unexpectedly increase the fatigue life of leaf springs (or other metal members) by preceding the steps of shot or strain peening by the step of effectively chilling the metal prior to such peening and maintaining the chill temperature during the peening operation. This novel technique has the further advantage that it improves the stress corrosion resistance of the treated leaf spring.

In summary, both loading and chilling contribute to increasing the residual compressive stresses at the tension surface, and shot peening of the chilled tension surface under strain traps those residual compressive stresses so that they are available to oppose tension stresses incident to normal operation and thus increase the spring life and efficiency.

The invention in a preferred embodiment will now be explained more in detail as applied to a leaf spring manufacturing process.

With reference to FIGS. 5 to 7, in practice and as applied to the manufacture of leaf springs for vehicles, a practical operation would consist of the following steps: After a spring leaf 10 has been processed up to the camber quench operation the leaf is tempered and immediately thereafter chilled to a desirable very low temperature, the value of which would be determined by the operational characteristic of the spring leaf when in duty. As will be more fully explained later, a spring leaf having an operational characteristic within a medium stress range such as in light duty operations as in passenger cars need not be chilled to as low a temperature as heavy duty leaf springs such as springs operating on higher stress levels. The chilling or refrigeration of the spring leaf may be accomplished by any one of a variety of methods such as by surrounding the spring leaf with Dry Ice, immersion of the leaf in a bath 12 of Dry Ice diluted with alcohol or mineral spirits as illustrated in FIG. 6, or by immersion of the leaf in liquid air or liquid nitrogen for maximum low temperatures. For medium low temperatures, it may suffice to simply place the spring leaf in a refrigerator unit for a certain length of time to attain a sufficiently low temperature. In any instance, the particular method of chilling is not critical and usually depends primarily on available facilities. In the case of a cambered leaf spring as illustrated, the leaf is chilled in cambered condition prior to being strained for shot peening.

After the spring leaf has reached the desired low temperature it is shot peened while in a chilled state. In some instances it may be shot peened while the refrigeration is maintained. Where the leaf is refrigerated in a bath it is removed from the bath and immediately shot peened. In the case of stress peening as illustrated in FIG. 7, spring leaf 10 is strained by applying a static load at the ends 14 and 16 of the leaf in the direction of normal service loading as indicated by the arrows. In order to maintain the static load during peening the leaf may be suitably clamped down at its ends as shown at 18.

The peening operation may be carried out with standard shot peening equipment (schematically illustrated at 20) for a sufficient time and intensity to thoroughly work and completely cover the surface to be peened. In general, no particular method is required, but it will be preferred to employ larger size shot at higher intensities with successively lower metal temperatures because of the increasing transitory surface hardness to allow the shot forces to penetrate the sub-surface layers. Although the shots themselves may be chilled and maintained at the same temperature as the article being shot peened, this is not necessary since it has been determined that the impact of shots kept at room temperature affected the temperature of the chilled metal article only to a negligible degree. In some tests, the temperature of the article was raised only about 15° F. by the creation of heat due to the impinging of the room temperature shot, which was found to be tolerable.

In regard to the manufacture of spring leaves herein illustrated by example, it will usually suffice to shot or strain peen only the intended tension surface 22 of the spring leaf and its adjacent side edges 24 which are usually scarfed as shown in FIG. 5a and have been previously ground smooth.

After the chilled spring leaf has been shot or strain peened, it may be further processed according to known manufacturing methods.

In this invention residual compression stress is operative in unexpectedly increasing the beneficial effect on the metal obtained by shot or strain peening, and this advantageous condition is retained when the metal member returns to and works in ambient temperature.

During the course of various fatigue tests in connection with the manufacture of shot or strain peened vehicle leaf springs the following procedures were followed:

Leaf spring samples were prepared from SAE 5160 spring steel by the foregoing methods including austenitizing the samples at a temperature of 1550° F. The samples were then quench formed, cambered in oil, and tempered at 900° F. so that the treated sample had a martensitic structure.

For the shot or strain peening operation No. 28 cast steel shot were used at an intensity of between 0.016 and 0.020 Almen A2. For strain peening, some of the cambered samples were strained prior to shot peening by stretching the samples flat; that is, by applying and maintaining a load at the ends of the spring samples in the direction of normal service loading. The samples were then cooled or chilled to various degrees ranging from +70- F. (room temperature) to −320° F. and immediately thereafter shot or strain peened.

The shot or strain peened samples were then fatigue tested by cycling at various stress ranges including the design stress under which the particular leaf spring was intended to operate in an actual application. The fatigue testing was done by unidirectional cycling from rebound to maximum load.

Exemplary test results have been tabulated in the following tables:

TABLE I
Fatigue cycles at indicated stress levels

| | Shot peened | | |
|---|---|---|---|
| | 30/140 k.s.i. | 45/155 k.s.i. | 60/170 k.s.i. |
| Temperatures: | | | |
| +70 | 264,000 | 224,000 | 196,000 |
| +30 | 398,000 | 310,000 | |
| 0 | ¹ 3,017,000 | | |
| −50 | ¹ 3,262,000 | | 236,000 |
| −75 | ¹ 1,067,000 | ¹ 1,080,000 | 325,000 |
| −100 | ¹ 1,099,000 | | ¹ 1,132,000 |
| −320 | ¹ 1,116,000 | ¹ 2,000,000 | ¹ 1,162,000 |

¹ Tests stopped before failure occurred.

TABLE II
Fatigue cycles at 65/190 k.s.i.

| | Strain peened at— | |
|---|---|---|
| | 120 k.s.i. | 170 k.s.i. |
| Temperatures: | | |
| +75 | 295,000 | 777,000 |
| 0 | ¹ 1,446,000 | ¹ 3,325,000 |
| −50 | | ¹ 1,040,000 |
| −100 | ¹ 1,218,000 | ¹ 3,390,000 |
| −320 | ¹ 3,370,000 | |

¹ Tests stopped before failure occurred.

Figure 2:
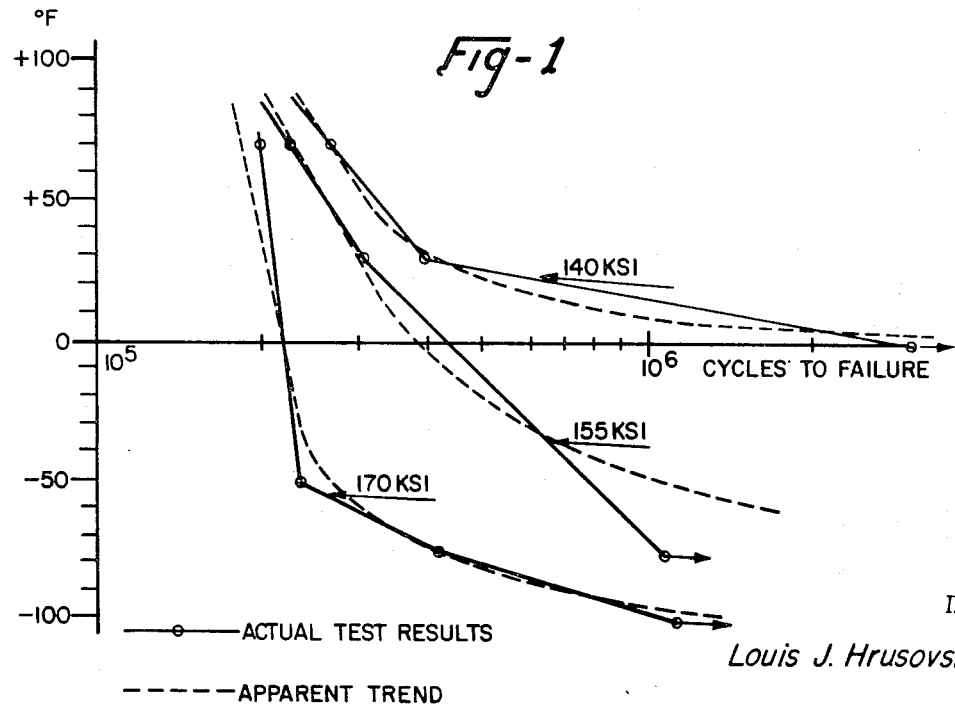
FIG. 2 is a diagram showing actual points of failure on solid lines and extrapolated dotted line curves illustrating the relationship between peening temperature and fatigue life of the metal article at various stress ranges.

From the above tables in connection with the curves and diagrams in FIGS. 1 and 2 it will be seen that the samples shot peened and strain peened at ambient temperature had by far the shortest fatigue life within any of the stress ranges. The samples which had been chilled to −320° F. and then shot peened and strain peened showed marked increase in fatigue life within the low and medium stress range over the unchilled samples with the greatest increase being found in the low stress range and indicating infinite life there. However, in the higher stress ranges the most marked improvement was found in the samples which had been strain peened. The samples which were chilled to about −100° F. showed the most marked increase within all three of the stress ranges used in the cycle tests with the highest increase being shown again when the samples were strain peened under a static load of around 160 k.s.i. It appears that the greatest increase in fatigue life takes place in highly stressed strain peened steel between 0° and −40° F.

Temperatures down to −100° F. are readily obtained by using mixtures of Dry Ice and alcohol or mineral spirits. Liquid nitrogen, which is commercially available, provides for chilling to −320° F.

Figure 4:
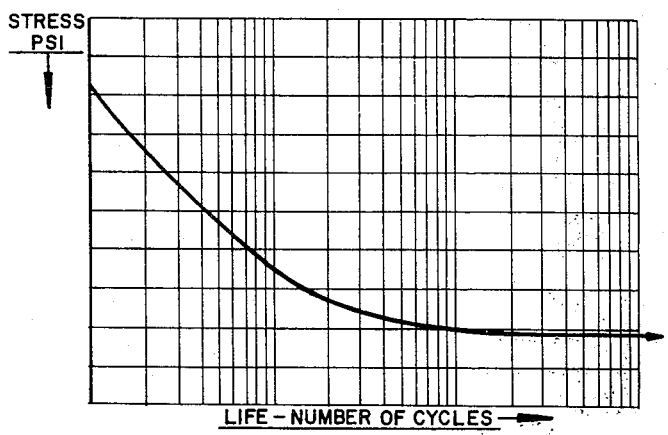
FIG. 4 is a typical S-N diagram commonly used in fatigue testing to plot the results of these tests.

It can be deduced from the foregoing that the actual realization of increases in fatigue life produced by the method of the invention may depend on the maximum operating stress to which the "chill-peened" part is subjected. There appears to be a definite relation between operating stress and fatigue life. As exemplified by the typical S-N curve shown in FIG. 4, which is plotted with the magnitude of the applied stress or load (S) as ordinate and the number of cycles (N) for fracture as abscissa, it will be seen that the fatigue life of any specimen is not a linear function of the applied stress. In other words, it will be noted that, as the operating stress decreases, the fatigue life increases at a geometrical rate. As the applied stress approaches the "knee" of the curve, a condition becomes present where a very small change in stress causes an indefinitely large change in fatigue life. Shot peening has the effect of raising the "knee" of the curve, and this holds true in stress peening as well as in the improved method of "chill peening." Thus, an extraordinary increase in fatigue life can be realized for any specimen tested in that region of applied stress.

Applying the foregoing discussion to the invention and with reference to the diagrams in FIGS. 1 and 2, it will be noted that the minimum chilling temperature for peening to obtain maximum increase in fatigue strength is dependent on the maximum applied stress. As seen from the diagram in FIG. 2, for the lower stress range a chilling temperature of around −50° F. will be found to be sufficient since it will be noted that a successively lower temperature to −100° F. did not produce any further measurable increase in fatigue life. In the medium and high stress ranges and when stress peening, a lower temperature of at least −100° F. or preferably even lower will be necessary to obtain a comparable increase in fatigue life.

The phenomenon of attaining increased fatigue life when shot or stress peening at successively lower temperatures is not fully understood but it is believed to be partly dependent upon the increased transitory hardness of the material at the low temperatures.

Figure 3:
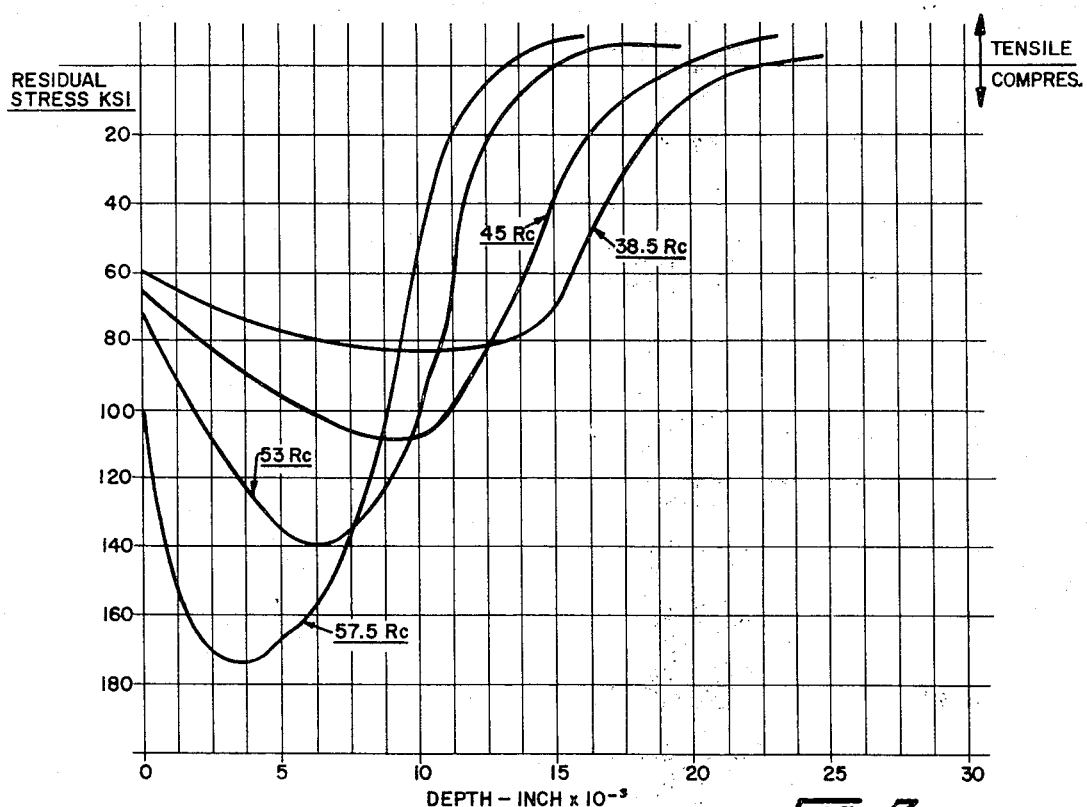
FIG. 3 is a hardness curve diagram of various hardnesses in relation to the respective compressive residual stresses vs. hardness depths.

Referring to the hardness curve diagram in FIG. 3, which was prepared from cross sections of metal at room temperatures, it will be seen that an increase in hardness produced a marked increase in the magnitude of residual compression stresses at steadily decreasing depths. In other words, with increasing hardness while the material is worked, maximum residual compression stresses will be concentrated in a shallow sub-surface layer where they are most beneficial. And, in order to obtain full effect of the shot peening treatment, it is desirable to concentrate a maximum amount of residual compression stresses immediately below the surface to be peened.

Test results indicated that the outer skin of the peened surface developed a saturation value of compressive stress very early in the peening operation. Continuing peening results in an increase of entrapped compressive stresses just below the surface and a deepening of the compressive layer. Thus, with reference to the diagram in FIG. 3, the compressive stresses which are entrapped by the shot peening operation at a hardness of 53 $R_c$ (Rockwell C) scale range from about 75 k.s.i. to a peak of about 140 k.s.i. at a depth of .006 inch, which is within the range of average depth of the compressive layer directly affected by the shot peening treatment. Below that depth compressive stresses steadily decrease towards transferral into tensile stresses. It will be seen that at an increased hardness to 57.5 $R_c$ the compressive residual stresses range from 100 k.s.i. at the surface to a peak of about 175 k.s.i. at a shallower depth of approximately .003 of an inch. This indicates that with an increase in the hardness of the material while it is worked a larger amount of compressive stresses may be entrapped with a simultaneous reduction in peening effort.

As can be noted from the diagram in FIG. 3, a decrease in the hardness of the material while it is worked causes a marked decrease in the magnitude of compressive stress at an increase in depth with the peak of the reduced stresses at a depth beyond the average depth normally affected by shot peening.

Residual compression stresses normally have a magnitude of about 50% of the yield strength or yield stress of the metal. As the transitory yield stress of the metal increases with the increase in transitory hardness, the maximum residual compression stress increases at a higher rate beyond the nominal 50% of the yield stress which is illustrated in the table below based on the curve diagram in FIG. 5.

| | Yield stress | Max. residual compression stress | Percent of yield stress |
|---|---|---|---|
| Hardness: | | | |
| 38.8 | 156,000 | 83,000 | 53 |
| 45 | 191,000 | 108,000 | 57 |
| 53 | 237,000 | 140,000 | 53 |
| 57.5 | 271,000 | 173,000 | 64 |

The realization of the foregoing is herein combined with the fact that the chilling of metal produces a temporary increase in hardness beyond that at room temperature and thus increases the magnitude of residual compressive stresses in the sub-surface compression layer, which accounts for the remarkable increase in fatigue strength obtained by the present novel shot peening method as well as the increase in corrosion resistance.

When impacted by shot, an increasingly smoother surface is produced at decreasing temperatures in comparison to articles shot peened at higher temperatures. This beneficial condition of diminishing surface roughness in association with decreasing shot peening temperatures further increases the fatigue strength of the metal part since it effectively inhibits excessive plastic metal flow at the surface during shot peening and thus prevents the formation of stress raisers and minimizes the possible adverse effect resulting from overpeening.

With reference to FIGS. 8 to 12, several samples of metal parts were shot peened at various temperatures whereafter surface roughness measurements were taken and recorded on a strip chart recorder. The height of roughness is specified in micro-inches as the arithmetical average of the absolute deviations from the mean surface. This is graphically shown in the charts of FIGS. 10 to 12 from which it can be seen that the specimens shot peened at room temperature produced a considerably rougher surface with deeper valleys and peaks than the specimens shot peened at below zero temperatures. At the lowest temperature of —320° F. shot peening produced an almost perfectly smooth surface. The deep crevices produced by shot peening at ambient temperatures are believed to be partly responsible for the lower fatigue life of metal parts shot peened at or above ambient temperatures.

Figure 10:
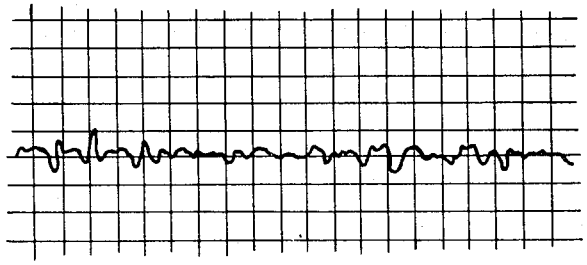
FIGS. 10 to 12 are strip chart records of surface roughness measurements taken on a leaf spring after shot peening at various temperatures.
Figure 11:
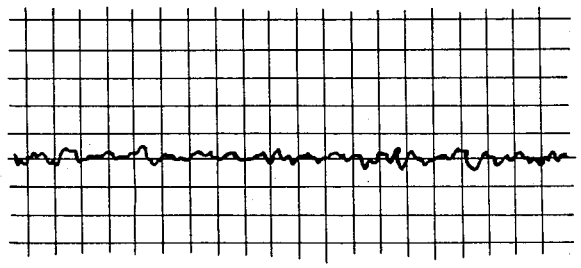
Figure 12:
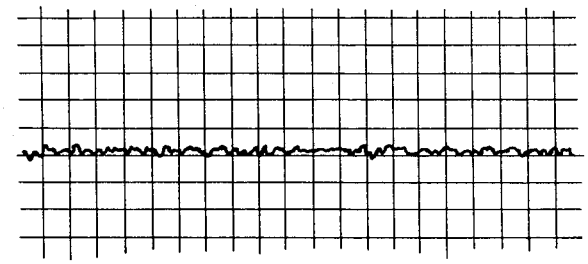

FIGS. 8 and 9 illustrate magnified surface portions of shot peened leaf springs which show that springs "chill-peened" at an ambient temperature as in FIG. 8 produced a pebbly appearance on the surface characterized by countless small indentations reproduced as high peaks and valleys in the roughness measurement chart of FIG. 10. On the other hand, leaf springs which were "chill-peened" at —320° F. as in FIG. 9 showed a remarkably smooth surface indicating that the impinging shot were not able to erase earlier grinding marks (shown as lines) from the surface.

In conclusion, the fatigue tests conducted within various operating stress ranges conclusively determined that the fatigue life of metal parts which in operation are subjected to relatively high dynamic load stresses, especially unidirectional stress at high frequencies, will be considerably enhanced by shot or strain peening when the metal is chilled sufficiently below room temperatures, preferably below 0° F., and advantageously below —40° F. and as low as —320° F. The extent of fatigue life improvement which can be realized is governed by the degree of reduction in temperature. In general, the lower the temperature, the greater the improvement when kept within its normal range of applied stress.

Tests conducted on other than non-austenitic ferrous metals (such as iron or spring steel) showed similar beneficial results for such non-austenitic materials as aluminum, magnesium, titanium, brass, and stainless steel.

To demonstrate the effect of the present novel method of commercial aluminum, specimens of an aluminum alloy 7075-T6 were cut from bar stock, heat treated, and artificially aged. The specimens were then subjected to a shot peening treatment at three temperature ranges; namely 70° F., —70° F., and —320° F. The shot peening was conducted with No. 28 cast steel shot at an intensity of Almen $A_2$0.017.

Thereafter the specimens were fatigue tested by subjecting them to unidirectional cycling at the following stress ranges:

10–50 k.s.i. (67% of tensile yield strength)
10–60 k.s.i. (80% of tensile yield strength)

The following table indicates the obtained test results:

| | Average cycles to failure within a stress range of: | |
|---|---|---|
| | 10–50 k.s.i. | 10–60 k.s.i. |
| Shot peening temperatures, ° F.: | | |
| 70 | 439,000 | 134,500 |
| —70 | 1,631,500 | 155,000 |
| —320 | 1,316,500 | 252,000 |

It will be noted that the specimens shot peened at below ambient temperatures showed a marked increase in fatigue life with the most pronounced effect being found in the lower stress range when chilled to —70° F. Further chilling below that temperature did not result in any further increase in fatigue life. The same could also be observed in the higher stress range where chilling to —70° F. was also found to produce a larger increase in life than the specimens shot peened at —320° F. This would suggest an ideal chilling temperature to obtain maximum increase in life of somewhere between —70° F. and —320° F. for this particular alloy.

The above tests also showed that the magnitude of the applied stress dictates the degree of increase in fatigue life realized by the present novel method. For example, operating at a maximum stress level of 50 k.s.i. or 67% of the yield strength of the aluminum, specimens shot peened at —70° F. realized at 270% increase in fatigue life over specimens shot peened at ambient temperature. It should be noted however, that, in practical applications aluminum components are usually designed to operate at stress levels considerably lower than 50 k.s.i. or 67% of the yield strength employed as the low stress range in this test.

Micro hardness measurements on cross sections of the specimens showed the shot peened surface to be strain hardened to a depth of 0.010 to 0.015 inch.

The present invention may be embodied in other specific forms without departing from the spirit and essential char-

What is claimed and desired to be secured by Letters Patent is:

1. The method of improving the physical properties and particularly the fatigue strength of a metallic leaf spring to be subjected to dynamic cyclical loading, bending or torsional stresses, comprising the steps of fabricating said article from a metallic material which is essentially free of austenite into substantially its final configuration, cooling the entire article to a temperature not substantially in excess of below zero degrees Fahrenheit; and, while the article is cooled to such temperature, working said article to thereby produce residual compressive stresses in at least one surface portion of the article.

2. The method of claim 1, wherein said metallic material comprises at least one of the group consisting of martensitic and ferritic steels.

3. The method of claim 1, wherein said metallic material comprises at least one of the group consisting of magnesium, titanium, and aluminum.

4. The method of claim 1, wherein the metallic material comprises brass.

5. The method of claim 1, wherein the article is worked at a temperature in the range of from about 0 to about −320 degrees Fahrenheit.

6. The method of claim 1, wherein said article is worked by shot peening.

7. The method of claim 1, wherein said article is worked by strain peening.

8. The method of claim 1, wherein said article is cooled by immersing it in a bath of Dry Ice and one of the group consisting of mineral spirits and alcohol.

9. An article of manufacture produced by the process of claim 1.

References Cited
UNITED STATES PATENTS

| | | | |
|---|---|---|---|
| 3,282,748 | 11/1966 | Martens | 148—125 |
| 2,717,846 | 9/1955 | Harvey | 148—12.4 |
| 2,527,287 | 10/1950 | Ziegler et al. | 148—12.3 |
| 2,795,519 | 6/1957 | Angel et al. | 148—12 |

WAYLAND W. STALLARD, Primary Examiner

U.S. Cl. X.R.

148—11.5 A, 11.5 F, 11.5 M, 12, 12.4, 125

PO-1050
(5/69)

UNITED STATES PATENT OFFICE
CERTIFICATE OF CORRECTION

Patent No. 3,764,401      Dated  October 9, 1973

Inventor(s)  Louis J. Hrusovsky

It is certified that error appears in the above-identified patent and that said Letters Patent are hereby corrected as shown below:

Column 3, line 70, delete entire sentence and insert following line 75.

Column 9, in table following line 25:  Line 30, delete "38.8" and insert --38.5--.

Signed and sealed this 1st day of April 1975.

(SEAL)
Attest:

RUTH C. MASON
Attesting Officer

C. MARSHALL DANN
Commissioner of Patents
and Trademarks